United States Patent
Grosse-Plankermann et al.

(10) Patent No.: US 9,156,554 B2
(45) Date of Patent: Oct. 13, 2015

(54) SYSTEM COMPONENT MODULE AND METHOD FOR MOUNTING IN AN AIRCRAFT CABIN

(75) Inventors: Peter Grosse-Plankermann, Neu Wulmstorf (DE); Thomas Fink, Hamburg (DE); Peter Kiron, Hamburg (DE); Martin Paetz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 480 days.

(21) Appl. No.: 13/526,107

(22) Filed: Jun. 18, 2012

(65) Prior Publication Data

US 2012/0312921 A1 Dec. 13, 2012

Related U.S. Application Data

(63) Continuation of application No. PCT/EP2010/007629, filed on Dec. 14, 2010.

(60) Provisional application No. 61/287,900, filed on Dec. 18, 2009.

(30) Foreign Application Priority Data

Dec. 18, 2009 (DE) .......................... 10 2009 058 849

(51) Int. Cl.
*B64D 11/00* (2006.01)
*B64D 13/00* (2006.01)

(52) U.S. Cl.
CPC .............. *B64D 11/003* (2013.01); *B64D 11/00* (2013.01); *B64D 13/00* (2013.01); *B64D 2011/0038* (2013.01); *B64D 2013/003* (2013.01); *Y02T 50/44* (2013.01); *Y02T 50/46* (2013.01)

(58) Field of Classification Search
CPC ................... B64D 11/00; B64D 13/00; B64D 2011/0046; B64D 2011/0053; B64D 2013/003
USPC .......... 244/118.1, 118.5; 206/335; 454/71, 76; 248/503
See application file for complete search history.

(56) References Cited

U.S. PATENT DOCUMENTS

| | | | |
|---|---|---|---|
| 3,330,506 A * | 7/1967 | Robillard et al. | 244/118.5 |
| 3,370,813 A * | 2/1968 | Albertine et al. | 244/118.5 |
| 5,108,048 A * | 4/1992 | Chang | 244/118.1 |
| 5,395,074 A * | 3/1995 | Hart et al. | 244/118.1 |
| 5,441,326 A * | 8/1995 | Mikalonis | 296/208 |

(Continued)

FOREIGN PATENT DOCUMENTS

| | | |
|---|---|---|
| DE | 10 2007 014 406 | 4/2008 |
| DE | 10 2007 030 331 | 1/2009 |

(Continued)

OTHER PUBLICATIONS

English language International Search Report for PCT/EP2010/007629, Aug. 1, 2011.

*Primary Examiner* — Tien Dinh
*Assistant Examiner* — Michael A Fabula
(74) *Attorney, Agent, or Firm* — Taft Stettinius & Hollister LLP

(57) ABSTRACT

A system component module (100) to be mounted in an aircraft cabin (22) comprises a support (28), to which a PSU duct (34) as well as an individual air supply system (72) are attached. A fastening device (112) is designed to fasten the system component module (100) to a bottom panel (32) of a luggage compartment (26) in the aircraft cabin (22).

12 Claims, 9 Drawing Sheets

(56) References Cited

U.S. PATENT DOCUMENTS

| | | | |
|---|---|---|---|
| 5,556,332 A * | 9/1996 | Schumacher | 454/76 |
| 5,687,929 A * | 11/1997 | Hart et al. | 244/118.1 |
| 5,803,062 A * | 9/1998 | Aulgur | 128/202.26 |
| 5,816,244 A * | 10/1998 | Aulgur | 128/206.27 |
| 6,007,024 A * | 12/1999 | Stephan | 244/118.1 |
| 6,991,276 B2 * | 1/2006 | McCauley et al. | 296/37.7 |
| 8,517,308 B2 * | 8/2013 | Schneider et al. | 244/118.5 |
| 8,643,211 B2 * | 2/2014 | Meckes et al. | 307/9.1 |
| 2006/0113810 A1 * | 6/2006 | Kuhl et al. | 296/24.34 |
| 2006/0237585 A1 | 10/2006 | Lau et al. | |
| 2008/0210814 A1 * | 9/2008 | Stephan et al. | 244/118.5 |
| 2009/0275277 A1 | 11/2009 | Al-Alusi et al. | |
| 2010/0087130 A1 * | 4/2010 | Nitsche et al. | 454/76 |
| 2010/0087131 A1 * | 4/2010 | Stuetzer et al. | 454/76 |
| 2010/0096919 A1 * | 4/2010 | Meckes et al. | 307/9.1 |
| 2010/0206985 A1 | 8/2010 | Rahlff | |
| 2011/0240796 A1 * | 10/2011 | Schneider | 244/118.5 |
| 2012/0032027 A1 * | 2/2012 | Gehm et al. | 244/118.5 |
| 2012/0223184 A1 * | 9/2012 | Schmid et al. | 244/118.5 |

FOREIGN PATENT DOCUMENTS

| | | |
|---|---|---|
| DE | 10 2008 048 743 | 4/2010 |
| DE | 10 2008 058 271 | 5/2010 |
| WO | WO 2009 003945 | 1/2009 |

\* cited by examiner

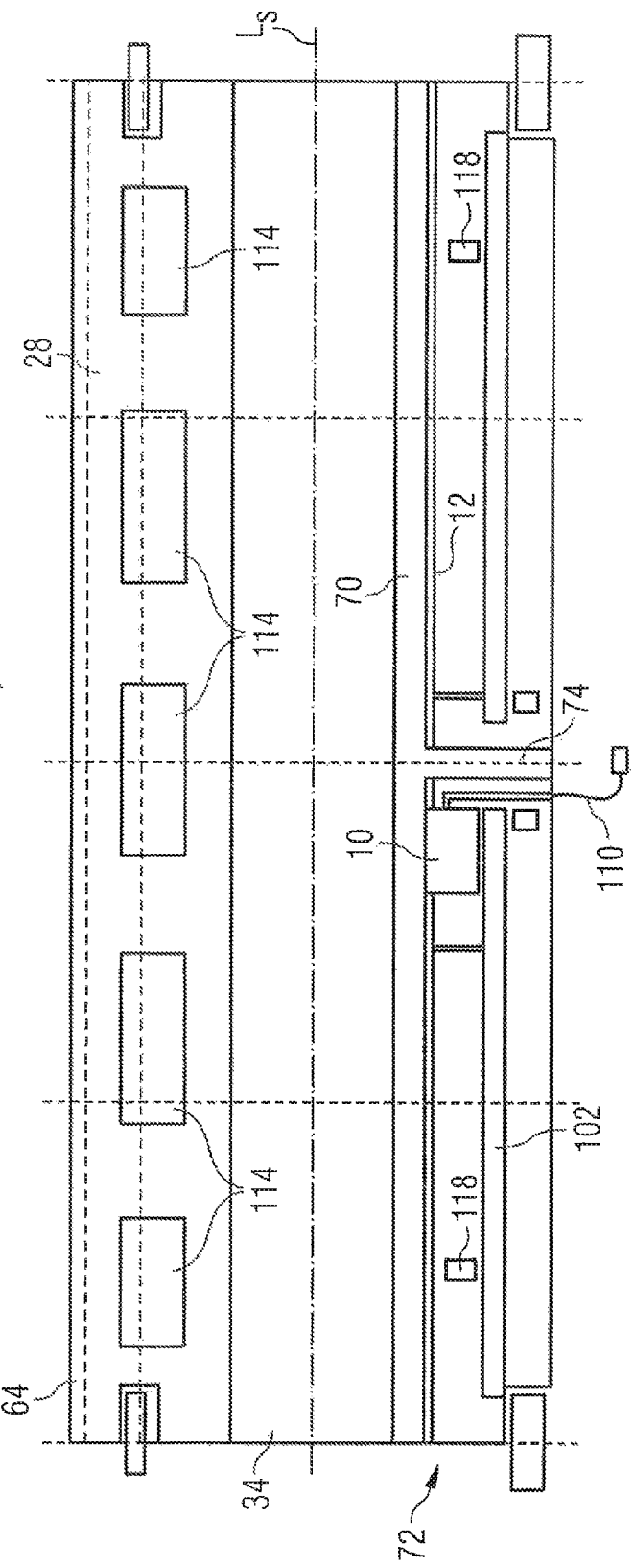

SYSTEM COMPONENT MODULE AND METHOD FOR MOUNTING IN AN AIRCRAFT CABIN

CROSS-REFERENCE TO RELATED APPLICATIONS

The present application is a continuation patent application of International Patent Application No. PCT/EP2010/007629, filed Dec. 14, 2010, which claims the benefit of U.S. Provisional Application No. 61/287,900, filed Dec. 18, 2009 and claims priority to German Patent Application No. 10 2009 058 849.3, filed Dec. 18, 2009, each of which is incorporated herein by reference.

TECHNICAL FIELD

The invention relates to a system component module provided for mounting in an aircraft cabin. The invention further relates to a method for mounting such a system component module in an aircraft cabin.

SUMMARY

At present, system components, which are arranged in an aircraft cabin in an area below luggage compartments used to accommodate items of hand luggage of the passengers, which area is also described as a PSU (personal service unit) area, are fastened predominantly individually in the aircraft cabin in the context of final assembly of the aircraft cabin. Only a handle strip, which extends in the mounted state in the aircraft cabin adjacent to an aisle area below the luggage compartments parallel to a longitudinal axis of the aircraft cabin, and holding elements, which extend in the mounted state in the aircraft cabin from a bottom panel of the luggage compartments in the direction of a floor of the aircraft cabin and are used to delimit a PSU duct extending from the bottom panel of the luggage compartments, are currently preassembled on the luggage compartments outside the aircraft before the luggage compartments are finally mounted in the aircraft cabin. A central oxygen supply system, a bracket for a class divider that is movable parallel to the longitudinal axis of the aircraft cabin, the PSUs accommodated in the PSU duct, an individual air supply system with a plurality of pipes and hoses and a power supply unit are each mounted separately, on the other hand, in the context of final assembly of the aircraft cabin.

Control devices for control of the personal service components of the PSUs arranged in the PSU duct must be fastened individually to the aircraft structure and cabled as part of the equipment assembly even before the final assembly of the aircraft cabin. Currently used control devices, which are part of an internal aircraft communications system for providing the passengers and cabin crew with information, normally serve six PSUs, which are usually arranged distributed within an area of the aircraft cabin extending over eight frames of the aircraft structure along the longitudinal axis of the aircraft cabin. The cabling for connection of a control device to the six PSUs has the layout illustrated in FIG. 1, therefore.

In the cabling layout according to FIG. 1, a control device 10 fastened to a frame of the aircraft structure, which device is formed as an electronic decoder/encoder unit, is connected to an electrical connection system 11. The electrical connection system 11 comprises a central cable loom 12, which is likewise fastened to the aircraft structure. Six connection cables 16a-16f provided with first connection plugs 14a-14f branch off from the central cable loom 12. The first connection plugs 14a-14f are provided to be connected to complementary second connection plugs 18a-18f of six PSUs 20a-20f to be controlled by the control device 10. During the final assembly of the aircraft cabin, when the PSUs 20a-20f are mounted individually in the installation space provided for them below the luggage compartments, the first connection plugs 14a-14f are each connected individually to their corresponding complementary second connection plugs 18a-18f.

The mounting of the aircraft system components provided for arrangement in the PSU area of the aircraft cabin and the connection of the PSUs to the cabling of the control devices controlling the personal service components of the PSUs, such as e.g. reading lamps, display devices, loudspeakers etc. is currently very time-consuming and thus cost-intensive. Moreover, many of the assembly jobs necessary have to be carried out in an ergonomically unfavourable position.

From DE 10 2007 030 331 and PCT/EP2008/058275 respectively an aircraft luggage compartment is known with a housing into which a personal service duct and an air line are integrated.

The invention is directed to the object of providing a system component module that permits simple and swift assembly in the aircraft cabin of aircraft system components provided for arrangement in a PSU area of an aircraft cabin. Furthermore, the invention is directed to the object of specifying a method for mounting such a system component module in an aircraft cabin.

This object is achieved by a system component module and a method of mounting a system component module in an aircraft cabin.

The system component module according to the invention to be mounted in an aircraft cabin comprises a support, to which a PSU duct as well as an individual air supply system is attached. The support can be formed plate-shaped, for example. The PSU duct attached to the support extends preferably parallel to a longitudinal axis of the system component module, from a surface of the support that faces a floor of the aircraft cabin in the mounted state of the system component module in the aircraft cabin. The longitudinal axis of the system component module runs preferably parallel to a longitudinal axis of the aircraft cabin in the mounted state of the system component module in the aircraft cabin.

The PSU duct, which is delimited on one side by the support, may be closed or covered on a side facing away from the support by means of a PSU duct cover and is used to accommodate PSUs, which for their part comprise personal service components, such as e.g. reading lamps, display devices, loudspeakers, individual air supply nozzles etc. A PSU duct in which no PSUs are accommodated may be closed or covered by a separate PSU duct cover. Alternatively to this, a PSU duct cover may also be formed integral with PSUs accommodated in the PSU duct. In other words, a component described here as PSU duct cover may either be a separate component for covering the PSU duct or a component of a PSU, for example a part of a housing of the PSU. In a preferred embodiment of the system component module according to the invention, at least one PSU is arranged in the PSU duct attached to the support. In an area delimiting the PSU duct, the support may be provided with openings, which reduce the weight of the support, make the laying of connection cables provided for connection to the personal service components arranged in the PSU duct easier and facilitate improved air circulation around the personal service components arranged in the PSU duct.

The individual air supply system attached to the support comprises preferably an individual air pipe, which extends parallel to the longitudinal axis of the system component module. The individual air pipe may have a connection pipe to connect the individual air pipe to an aircraft air conditioning system, through which conditioned air produced by the aircraft air conditioning system can be supplied to the individual air pipe. Alternatively to this, however, it is also possible to supply conditioned air to an individual air pipe of a system component module according to the invention via an individual air pipe of an adjacent system component module, so that it is not necessary to provide a connection pipe for connection of the individual air pipe to the aircraft air conditioning system in each system component module provided to be mounted in an aircraft cabin. The individual air supply system attached to the support of the system component module according to the invention further comprises preferably at least one individual air branch line branching off from the individual air pipe, which line connects the individual air pipe to at least one individual air supply nozzle of a PSU arranged in the PSU duct.

Furthermore, the system component module according to the invention comprises a fastening device, which is designed to fasten the system component module to a bottom panel of a luggage compartment provided in the aircraft cabin. In particular, the fastening device is designed to fasten the support to a surface of the luggage compartment bottom panel that faces a floor of the aircraft cabin in the mounted state of the luggage compartment in the aircraft cabin.

The system component module according to the invention makes it possible to finally mount the PSU duct, in which at least one PSU may also already be arranged if applicable, and the individual air supply system in just one assembly step in a simple and convenient manner in the aircraft cabin. Pre-assembly steps, such as e.g. the connection of the individual air branch lines to the individual air pipe of the individual air supply system or the connection of the individual air branch lines to the PSU duct or to the individual air supply nozzles arranged in the PSU duct, can be carried out outside the aircraft, on the other hand. The system component module according to the invention thus facilitates significant time and cost savings in the final assembly of aircraft system components provided for arrangement in the PSU area of an aircraft cabin. Moreover, the system component module according to the invention facilitates a minimisation of assembly work steps that have to be carried out in an ergonomically unfavourable position.

A handle strip may also be fastened to the support of the system component module according to the invention, which strip extends parallel to the longitudinal axis of the system component module. In the mounted state of the system component module in the aircraft cabin, the handle strip is preferably positioned in a section of the PSU area that is adjacent to an aisle area of the aircraft cabin. A luggage protection edge may also be attached to the support, which edge extends parallel to the longitudinal axis of the system component module and in the mounted state of the system component module in the aircraft cabin encompasses an edge of the luggage compartment bottom panel facing the aisle area of the aircraft cabin. Furthermore, a handle strip cover may be mounted on the support, which cover extends substantially parallel to the support and is used to bridge a gap between the handle strip and the PSU duct.

Moreover, a cabin lighting panel may be attached to the support, which panel extends parallel to the longitudinal axis of the system component module substantially parallel to the support and is arranged in the mounted state of the system component module in the aircraft cabin in a section of the PSU area close to the window. A power supply unit, a so-called ballast unit, may further be fastened to the support and may likewise extend parallel to the longitudinal axis of the system component module and be arranged in a section of the PSU area close to the window in the mounted state of the system component module in the aircraft cabin.

Finally, the support may be connected to a plurality of electrical and/or electronic components. For example, a device for dissipating static electrical charge may be attached to the support. The support may further bear at least one control device for controlling personal service components arranged in the PSU duct. Finally, an electrical connection system for connecting the control device for controlling personal service components arranged in the PSU duct to the personal service components arranged in the PSU duct may be attached to the support. The electrical connection system may comprise connection cables and/or connection plugs.

Aircraft system components fastenable to the support and provided for mounting in a PSU area of an aircraft cabin no longer have to be mounted individually in their final assembly position in the aircraft cabin. Instead, these aircraft system components can be preassembled in a convenient manner together with the support outside the aircraft into an independently manageable module assembly and then finally mounted together in the aircraft cabin in just one working step. The time and cost advantages achievable with the aid of the system component module according to the invention are all the greater, therefore, the more system components can be pre-assembled on the support of the system component module prior to final mounting of the system component module in the aircraft cabin.

If the support of the system component module according to the invention is designed to bear at least one control device for controlling personal service components arranged in the PSU duct and an electrical connection system for connecting this control device to the personal service components arranged in the PSU duct, the complete connection cabling between the control device and the personal service components can be laid outside the aircraft and integrated into the system component module according to the invention. Then only one connection cable for connecting the control device integrated into the system component module to a higher-level aircraft system, for example a communications system for providing the passengers and the cabin crew with information, is required per system component module.

In a preferred embodiment of the system component module according to the invention, a first holding element is further attached to the support, which element extends from a surface of the support facing away from the bottom panel of the luggage compartment in the direction of the floor of the aircraft cabin in the mounted state of the system component module in the aircraft cabin. The first holding element, which may also be formed in one piece with the support, serves preferably as an aisle-side delimitation of the PSU duct in the mounted state of the system component module in the aircraft cabin and is provided to fasten an aisle-side section of the PSU duct cover and/or the handle strip cover to the support.

The first holding element may comprise a first connection element, which is designed to engage with a complementary connection element of the PSU duct cover to fasten the PSU duct cover to the support by a displacement of the PSU duct cover relative to the support in the direction of the longitudinal axis of the system component module. Furthermore, the first holding element may comprise a second connection element, which is designed to engage with a complementary connection element of the handle strip cover to fasten the handle strip cover to the support by a displacement of the handle strip cover relative to the support in the direction of the longitudinal axis of the system component module.

The connection elements provided on the first holding element and on the PSU duct cover and/or the handle strip cover may be formed for example in the form of rails, which engage in one another when the PSU duct cover and/or the handle strip cover are displaced in the direction of the longitudinal axis of the system component module relative to the support. Alternatively to this, the connection elements formed on the first holding element as well as on the PSU duct cover and/or the handle strip cover may also be formed in the form of snap-on connection elements, however, which permit "plugging" of the PSU duct cover and/or the handle strip cover onto the support of the system component module by a movement of the PSU duct cover and/or the handle strip cover relative to the support in a direction perpendicular to the support towards the support.

A second holding element may further be attached to the support of the system component module, which element, like the first holding element, extends from a surface of the support facing away from the bottom panel of the luggage compartment in the direction of the floor of the aircraft cabin in the mounted state of the system component module in the aircraft cabin. The second holding element, which may also be formed in one piece with the support, is preferably integrated, i.e. executed in one piece with the individual air pipe of the individual air supply system extending parallel to the longitudinal axis of the system component module and serves preferably as a window-side delimitation of the PSU duct in the mounted state of the system component module in the aircraft cabin. Furthermore, the second holding element is preferably provided to fasten a window-side section of the PSU duct cover and/or the cabin lighting panel to the support.

The second holding element may comprise a first connection element, which is designed to engage with a complementary connection element of the PSU duct cover to fasten the PSU duct cover to the support by a displacement of the PSU duct cover relative to the support in the direction of the longitudinal axis of the system component module. Furthermore, the first holding element may comprise a second connection element, which is designed to engage with a complementary connection element of the cabin lighting panel to fasten the cabin lighting panel to the support by a displacement of the cabin lighting panel relative to the support in the direction of the longitudinal axis of the system component module.

The connection elements formed on the second holding element as well as on the PSU duct cover and/or the cabin lighting panel may be executed in turn in the form of rails, which engage in one another when the PSU duct cover and/or the cabin lighting panel are displaced in the direction of the longitudinal axis of the system component module relative to the support. Alternatively to this, the connection elements executed on the second holding element as well as on the PSU duct cover and/or the cabin lighting panel may also be designed as snap-on connection elements, however, which permit "plugging" of the PSU duct cover and/or the cabin lighting panel by a movement of the PSU duct cover and/or the cabin lighting panel relative to the support in a direction perpendicular to the support towards the support.

The individual air pipe of the individual air supply system comprises preferably on at least one of its ends an end section, which is offset relative to a central section of the individual air pipe adjoining the end section in at least one direction perpendicular to a longitudinal axis of the central section of the individual air pipe. The individual air pipe preferably has on both of its ends end sections which are offset relative to the central section of the individual air pipe in the direction of a side wall of the aircraft cabin, i.e. window-side and in the direction of the support in the mounted state of the system component module in the aircraft cabin.

A configuration of this kind of the individual air pipe takes account of the limited mounting space in the system component module according to the invention and in particular of a thickening of the diameter of the individual air pipe that occurs when the individual air pipes of adjacent system component modules are connected to one another by a pipe collar. Movable pipe collars are preferably used to connect the offset end sections of the individual air pipes of adjacent system component modules.

The fastening device for fastening the system component module to the luggage compartment bottom panel preferably comprises an opening formed in the support and a mounting element fastenable to the luggage compartment bottom panel. The opening formed in the support and the mounting element fastenable to the luggage compartment bottom panel are preferably designed to permit, in the case of a movement of the system component module perpendicular to the bottom panel of the luggage compartment towards the bottom panel of the luggage compartment, initially a take-up of the mounting element fastened to the bottom panel of the luggage compartment in the opening and then a displacement of the system component module relative to the bottom panel of the luggage compartment in a direction parallel to the bottom panel of the luggage compartment until the system component module has reached a desired final assembly position in the aircraft cabin. For example, the opening and the mounting element may be dimensioned and shaped such that the system component module can be displaced parallel to the bottom panel of the luggage compartment and perpendicular to the longitudinal axis of the system component module, in order to bring the system component module into its final assembly position. Such an assembly movement is particularly convenient to execute and also permits a luggage protection edge fastened to the support of the system component module to be pushed over the edge of the luggage compartment bottom panel facing the aisle area of the aircraft cabin.

The mounting element may be fastened by screws, rivets or quick clamps to the luggage compartment bottom panel. Furthermore, screws, rivets or quick clamps may be used to fasten the system component module, for example in the area of the handle strip, to the mounting element. The mounting element and the opening in the support interacting with the mounting element preferably serve to fasten an area of the system component module on the aisle side in the mounted state of the system component module in the aircraft cabin to the luggage compartment bottom panel. If desired or necessary, several mounting elements arranged distributed along the longitudinal axis of the system component module and openings in the support interacting with the mounting elements may be provided, in order to fasten the aisle-side area of the system component module in the mounted state of the system component module in the aircraft cabin to the luggage compartment bottom panel.

To fasten a window-side area of the system component module in the mounted state of the system component module in the aircraft cabin to the luggage compartment bottom panel, the fastening device preferably further comprises a further opening formed in the support, a fastening lug protruding into the opening and a fastening clip fastenable to the bottom panel of the luggage compartment. The further opening formed in the support and the fastening clip fastenable to the luggage compartment bottom panel are designed to permit, in the case of a movement of the system component module perpendicular to the bottom panel of the luggage compartment towards the bottom panel of the luggage compartment, initially a take-up of the fastening clip fastened to the bottom panel of the luggage compartment in the opening and then a displacement of the system component module relative to the bottom panel of the luggage compartment in a direction parallel to the bottom panel of the luggage compartment until the fastening lug of the support is taken up in a desired final assembly position of the system component module in the aircraft cabin in the fastening clip fastened to the bottom panel of the luggage compartment.

The fastening clip may be fastened by screws, rivets or quick clamps to the luggage compartment bottom panel. Furthermore, screws, rivets or quick clamps may be used to fasten the system component module, for example in the area of the fastening lug of the support, to the fastening clip. If desired or necessary, several fastening clips arranged distributed along the longitudinal axis of the system component module and further openings in the support interacting with the fastening clips may be provided, in order to attach the window-side area of the system component module in the mounted state of the system component module in the aircraft cabin to the luggage compartment bottom panel.

in a method according to the invention for mounting a system component module in an aircraft cabin, first a PSU duct as well as an individual air supply system is attached to a support of the system component module. Then the system component module, i.e. the support with the PSU duct attached thereto and the individual air supply system attached thereto, is fastened to a bottom panel of a luggage compartment provided in an aircraft cabin.

Prior to fastening of the system component module to the bottom panel of the luggage compartment, a handle strip, a luggage protection edge, a handle strip cover, a cabin lighting panel, a ballast unit, a device for dissipating static electrical charge, a control device for controlling personal service components arranged in the PSU duct and/or an electrical connection system for connecting a control device for controlling personal service components arranged in the PSU duct to the personal service components arranged in the PSU duct may further be attached to the support.

A PSU duct cover and/or the handle strip cover may be fastened to the support by means of a first holding element, which may be formed in one piece with the support and extend from a surface of the support facing away from the bottom panel of the luggage compartment in the direction of the floor of the aircraft cabin in the mounted state of the system component module in the aircraft cabin. To fasten the PSU duct cover and/or the handle strip cover to the support, the PSU duct cover and/or the handle strip cover may be displaced relative to the support in the direction of the longitudinal axis of the system component module, so that at least one connection element of the first holding element engages with a complementary connection element of the PSU duct cover and/or the handle strip cover.

Furthermore, the PSU duct cover and/or the cabin lighting panel may be fastened to the support by means of a second holding element, which may be formed in one piece with the support and extend from a surface of the support facing away from the bottom panel of the luggage compartment in the direction of the floor of the aircraft cabin in the mounted state of the system component module in the aircraft cabin. The second holding element may further be formed integral with an individual air pipe of the individual air supply system extending parallel to the longitudinal axis of the system component module. To fasten the PSU duct cover and/or the cabin lighting panel to the support, the PSU duct cover and/or the cabin lighting panel may be displaced relative to the support in the direction of the longitudinal axis of the system component module, so that at least one connection element of the second holding element engages with a complementary connection element of the PSU duct cover and/or the cabin lighting panel.

The individual air pipe of the individual air supply system is preferably connected via an end section formed on at least one of its ends to an individual air pipe of an individual air supply system of an adjacent system component module, which section is offset relative to a central section of the individual air pipe adjoining the end section in at least one direction perpendicular to a longitudinal axis of the central section of the individual air pipe.

In the fastening of the system component module to the bottom panel of the luggage compartment, first a mounting element may be fastened to the bottom panel of the luggage compartment. Then the system module component may be moved perpendicular to the bottom panel of the luggage compartment towards the bottom panel of the luggage compartment in such a way that the mounting element attached to the bottom panel of the luggage compartment is taken up in an opening formed in the support. Then the system component module may be displaced in a direction parallel to the bottom panel of the luggage compartment relative to the luggage compartment bottom panel into a desired final assembly position in the aircraft cabin. The displacement of the system component module preferably takes place relative to the luggage compartment bottom panel parallel to the luggage compartment bottom panel and perpendicular to the longitudinal axis of the system component module. Finally, the system component module may be fixed on the mounting element by screws, rivets or quick clamps.

Furthermore, in the fastening of the system component module to the bottom panel of the luggage compartment, a fastening clip may be fastened to the bottom panel of the luggage compartment. Then the system component module may be moved perpendicular to the bottom panel of the luggage compartment towards the bottom panel of the luggage compartment in such a way that the fastening clip fastened to the bottom panel of the luggage compartment is taken up in a further opening formed in the support. Then the system component module may be displaced in a direction parallel to the bottom panel of the luggage compartment and preferably perpendicular to the longitudinal axis of the system component module relative to the bottom panel of the luggage compartment until a fastening lug of the support protruding into the opening is taken up in the fastening clip fastened to the bottom panel of the luggage compartment in a desired final assembly position of the system component module. Finally the system component module may if desired be fixed additionally to the fastening clip, for example in the area of the fastening lug of the support, by screws, rivets or quick clamps.

BRIEF DESCRIPTION OF THE FIGURES

A preferred embodiment of the invention is now explained in greater detail with reference to the enclosed schematic drawings, in which:

FIG. 4 shows a top view of the system component module according to FIG. 3.

DETAILED DESCRIPTION OF THE ILLUSTRATIVE EMBODIMENTS

Figure 1:
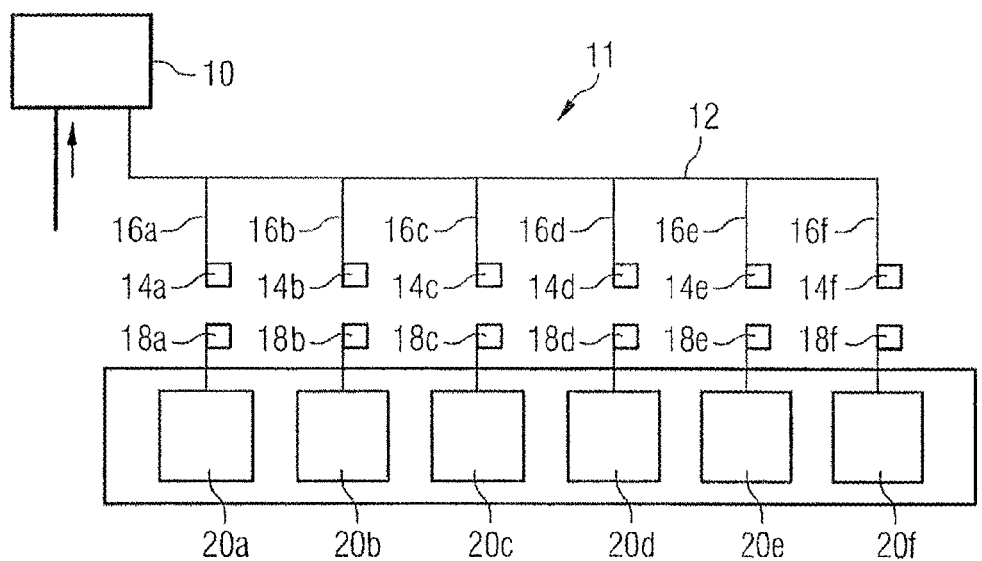
FIG. 1 shows the layout of cabling to connect a control device to six PSUs according to the prior art.
Figure 2:
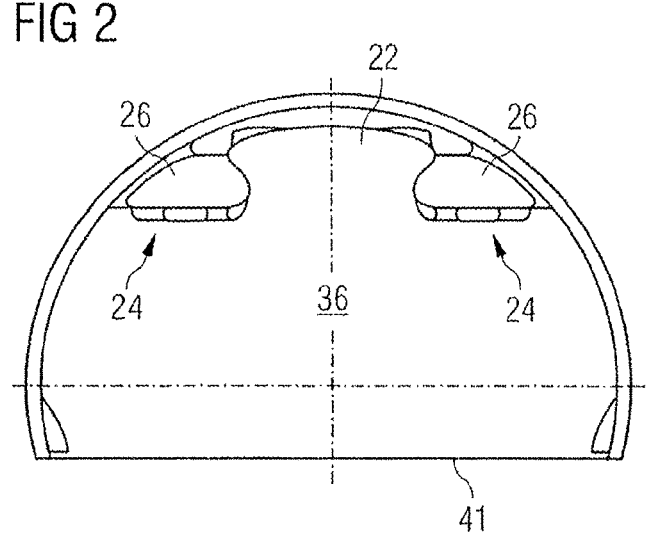
FIG. 2 shows a schematic cross-section through an aircraft cabin.

A system component module generally designated 100 in the figures is provided to be mounted in an aircraft cabin 22 shown in FIG. 2 in a PSU area 24 below overhead luggage compartments 26 provided in the aircraft cabin 22. The system component module 100 comprises a plate-shaped support 28, which has a substantially rectangular basic shape and is provided to be fastened to a surface 30 of a luggage compartment bottom panel 32 (see in particular FIGS. 3 and 5a to 5c).

Attached to the support 28 is a PSU duct 34, which extends parallel to a longitudinal axis $L_s$ of the system component module 100. At least one PSU 20a-20f can be accommodated in the PSU duct 34. The system component module 100 is preferably so dimensioned, however, that several, for example 3 or 6 PSUs 20a-20f, can be arranged in the PSU duct 34. Each PSU 20a-20f comprises a plurality of personal service components, such as e.g. reading lamps, display devices, loudspeakers, individual air supply nozzles etc. In an area delimiting the PSU duct 34, the support is provided with openings 35, which reduce the weight of the support 28, make the laying of connection lines provided for connection to the personal service components arranged in the PSU duct 34 easier and facilitate improved air circulation around the personal service components arranged in the PSU duct 34.

In the mounted state of the system component module 100 in the aircraft cabin 22, the PSU duct 34 is delimited on a side facing an aisle area 36 of the aircraft cabin 22 by a first holding element 38 (see FIGS. 3 and 5a to 5c). The first holding element 38 is formed in one piece with the support 28 of the system component module 100 and extends in the mounted state of the system component module 100 in the aircraft cabin 22 from a surface 40 of the support 28 facing away from the bottom panel 32 of the luggage compartment 26 in the direction of a floor 41 of the aircraft cabin 22.

Attached to the first holding element 38 is a first connection element 42, which is formed in the shape of a connection rail. The first connection element 42 of the first holding element 38 is provided to engage with a complementary connection element 44 formed likewise in the shape of a connection rail, which element is attached to a PSU duct cover 46. In particular, the first connection element 42 of the first holding element 38 has a projection 48, which is provided to be taken up in a groove 50, which is formed in the connection element 44 provided on the PSU duct cover 46. The first connection element 42 of the first holding element 38 can be brought into engagement along the longitudinal axis $L_s$ of the system component module 100 with the complementary connection element 44 of the PSU duct cover 46, in that the PSU duct cover 46 is displaced parallel to the longitudinal axis $L_s$ of the system component module 100 relative to the support 28. The first connection element 42 of the first holding element 38 thus serves to fasten an aisle-side section of a PSU duct cover 46 to the support 28.

Furthermore, a second connection element 52 formed likewise in the shape of a connection rail is attached to the first holding element 38. The second connection element 52 of the first holding element 38 is provided to engage with a complementary connection element 54, which is likewise executed in the shape of a connection rail and attached to a handle strip cover 56. Similar to the first connection element 42, the second connection element 52 of the first holding element 38 also has a projection 58, which is provided to be taken up in a groove 60, which is executed in the connection element 54 of the handle strip cover 56. The connection element 54 of the handle strip cover 56 can be brought into engagement with the second connection element 58 of the first holding element 38 along the longitudinal axis $L_s$ of the system component module 100 in that the handle strip cover 56 is displaced parallel to the longitudinal axis $L_s$ of the system component module 100 relative to the support 28. In its state fastened to the support 28 via the first holding element 38, the handle strip cover 56 extends substantially parallel to the support 28 and serves to bridge a gap between the PSU duct 34 and a handle strip 62 attached to the support 28.

In the mounted state of the system component module 100 in the aircraft cabin 22, the handle strip 62 extends parallel to the longitudinal axis $L_s$ of the system component module 100 in a section of the PSU area 24 that faces the aisle area 36 of the aircraft cabin 22. Fastened to the support 28 of the system component module 100 adjacent to the handle strip 62 is a luggage protection edge 64. In the mounted state of the system component module 100 in the aircraft cabin 22, the luggage protection edge 64 encompasses an edge 66 of the luggage compartment bottom panel 32, which faces the aisle area 36 of the aircraft cabin 22 (see FIGS. 5a to 5c).

Figure 7A:
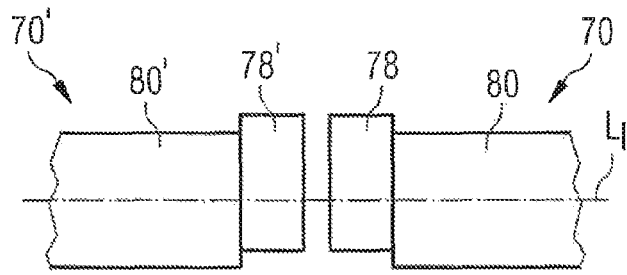
FIGS. 7a to 7c show a side view, a top view and a front view of an individual air pipe with offset end sections integrated into the system component module according to FIG. 3, FIGS. 8a and 8b show a first embodiment of a fastening lug and a fastening clip for fastening the system component module according to FIG. 3 to a bottom panel of a luggage compartment.
Figure 7B:
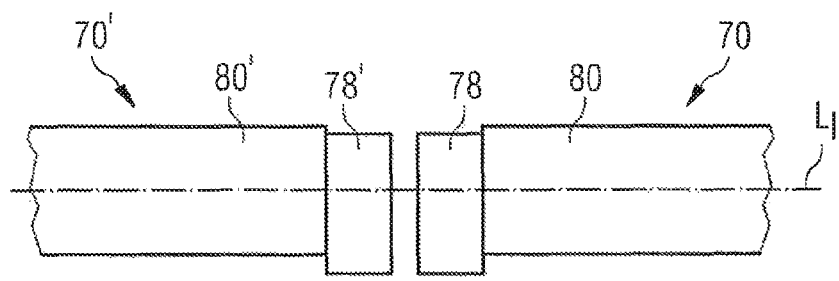

In the mounted state of the system component module 100 in the aircraft cabin 22, the PSU duct 34 is delimited on the window side by a second holding element 68 formed in one piece with the support 28 of the system component module 100. Similar to the first holding element 38, the second holding element 68 extends from the surface 40 of the support 28 that faces away from the surface 30 of the luggage compartment bottom panel 32 in the mounted state of the system component module 100 in the aircraft cabin 22. Formed integrally, i.e. in one piece with the second holding element 68 is an individual air pipe 70 of an individual air supply system 72, which extends parallel to the longitudinal axis $L_s$ of the system component module 100. The individual air pipe 70 can be connected to an air conditioning system of the aircraft via a connection pipe 74 shown in FIG. 4. Alternatively to this, however, it is also possible to supply conditioned air to an individual air pipe 70 of a system component module 100 via an individual air pipe 70' of an adjacent system component module (see FIGS. 7a and 7b). Consequently a connection pipe 74 does not have to be provided in every system component module 100 provided for mounting in the aircraft cabin 22.

Figure 7C:
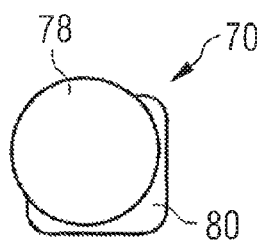
Figure 8A:
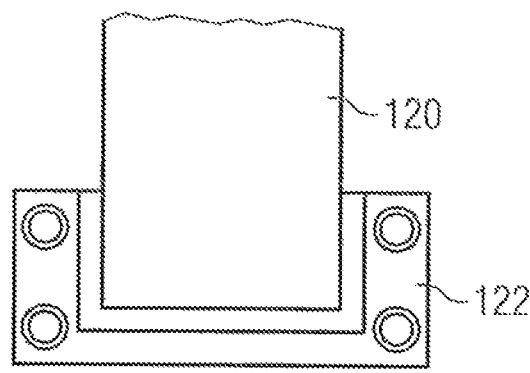
Figure 8B:
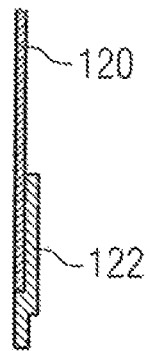
Figure 9A:
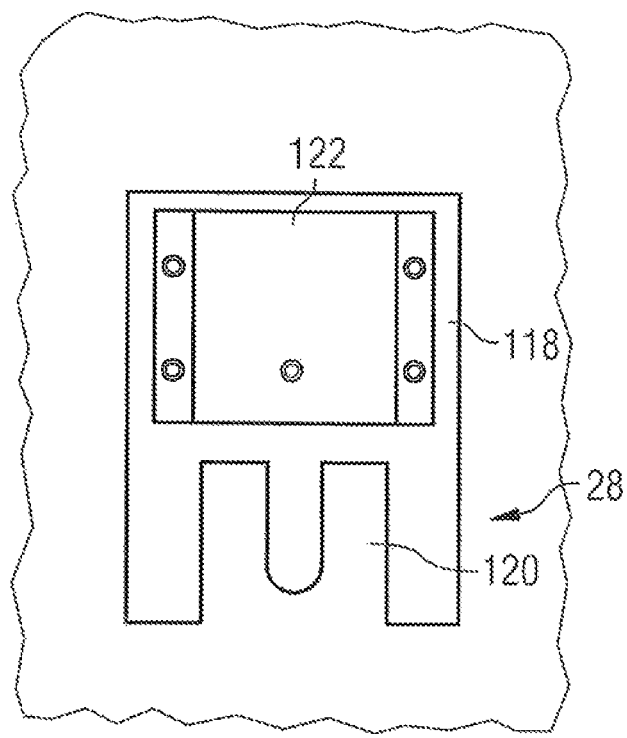
FIGS. 9a and 9b show a further embodiment of a fastening lug and a fastening clip for fastening the system component module according to FIG. 3 to a bottom panel of a luggage compartment.
Figure 9B:
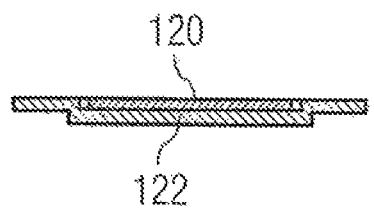
Figure 10A:
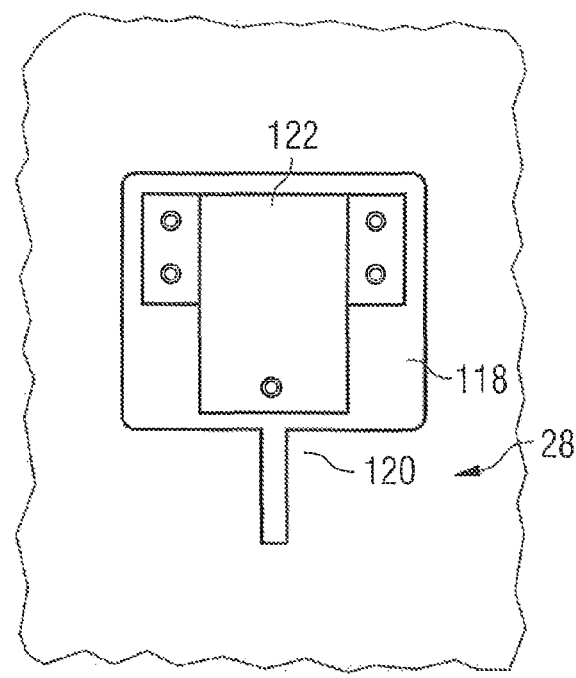
FIGS. 10a and 10b show a further embodiment of a fastening lug and a fastening clip for fastening the system component module according to FIG. 3 to a bottom panel of a luggage compartment.
Figure 10B:
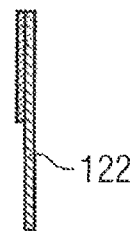

Branching off from the individual air pipe 70 is a plurality of individual air branch lines 76, which connect the individual air pipe 70 to individual air supply nozzles of the PSUs 36 arranged in the PSU duct 74. The individual air pipe 70 further comprises on both its ends respectively an end section 78, which is offset relative to a central section 80 of the individual air pipe 70 adjoining the end section 78 relative to a longitudinal axis $L_I$ of the central section 80 of the individual air pipe 70 (see FIGS. 7a to 7c). In the mounted state of the system component module 100 in the aircraft cabin 22, the end sections 78 of the individual air pipe 70 are offset relative to the central section 80 of the individual air pipe 70 on the window side and in the direction of the support 28 and the luggage compartment bottom panel 32 respectively. Due to the offset arrangement of the end sections 78 of the individual air pipe 70, connection of the end sections 78, 78' of the individual air pipes 70, 70' of two adjacent system component modules 100 to one another is facilitated by means of a movable pipe collar, although the movable pipe collar thickens the diameter of the individual air pipes 70, 70'.

Also attached to the second holding element 68 supporting the individual air pipe 70 is a first connection element 82 formed in the shape of a connection rail. The first connection element 82 is provided to interact with a complementary connection element 84 of the PSU duct cover 46. The first connection element 82 of the second holding element 68 is provided with a projection 86, which is provided to be taken up in a groove 88 formed in the complementary connection element 84 of the PSU duct cover 46 when the PSU duct cover 46 is displaced parallel to the longitudinal axis $L_s$ of the system component module 100 relative to the support 28.

Moreover, the second holding element 68 bears a second connection element 90 formed likewise in the shape of a connection rail. The second connection element 90 of the second holding element 68 is provided to interact with a complementary connection element 92 of a cabin lighting panel 94. The second connection element 90 of the second holding element 68 is provided in turn with a projection 96, which engages with a groove 98 formed in the connection element 92 of the cabin lighting panel 94 when the cabin lighting panel 94 is displaced parallel to the longitudinal axis $L_s$ of the system component module 100 relative to the support 28. In its state fastened via the second holding element 68 to the support 28, the cabin lighting panel 94 extends substantially parallel to the support 28 and, in the mounted state of the system component module 100 in the aircraft cabin 22, also substantially parallel to the luggage compartment bottom panel 32. In the state mounted on the support 28 via the first holding element 38 and the second holding element 68, the PSU duct cover 46 extends substantially parallel to the support 28 and in the mounted state of the system component module 100 in the aircraft cabin 22, also substantially parallel to the luggage compartment bottom panel 32.

Also fastened to the support 28 of the system component module 100 is a ballast unit 102, which extends substantially parallel to the longitudinal axis $L_s$ of the system component module 100 (see FIG. 4). The support 28 of the system component module 100 further supports a device 104 formed in the form of an earth plug for dissipating static electrical charge (see FIG. 3). Finally, a control device 10 formed in the form of an electronic decoder/encoder unit is attached to the support 28.

Figure 6:
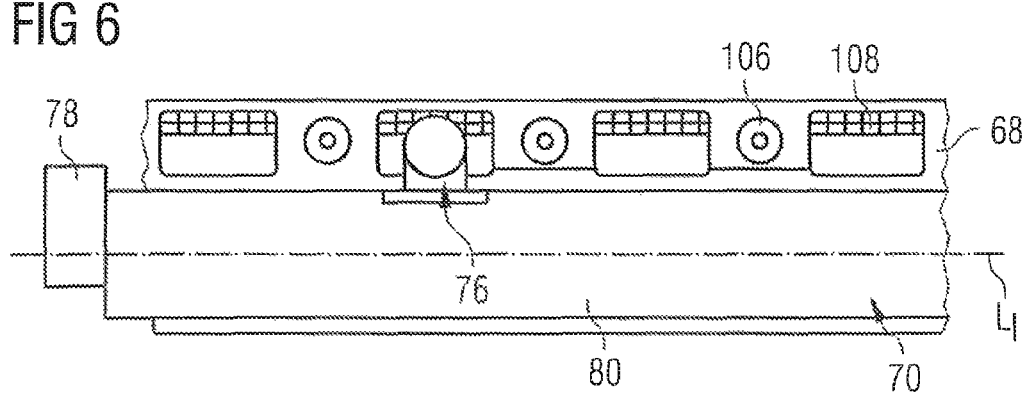
FIG. 6 shows a detail view of the system component module according to FIG. 3.
Figure 11:
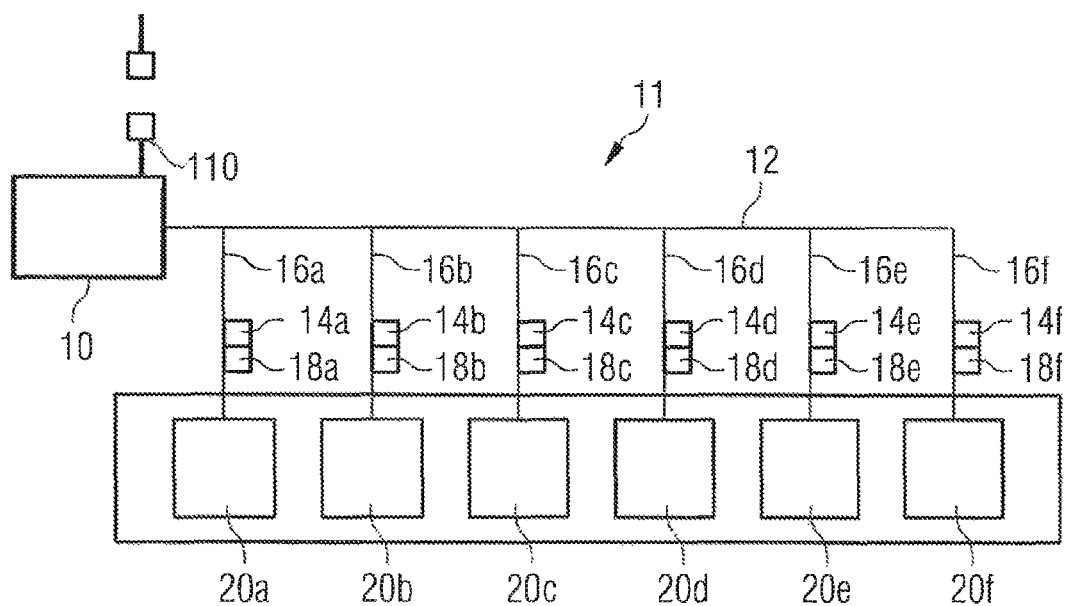
FIG. 11 shows the layout of cabling to connect a control device to six PSUs in the system component module according to FIG. 3.

As can best be recognised from FIG. 11, the control device 10 is connected to an electrical connection system 11. The electrical connection system 11 comprises a central cable loom 12, from which six connection cables 16a-16f provided with first connection plugs 14a-14f branch off. The first connection plugs 14a-14f are each provided with second connection plugs 18a-18f, in order to connect the control device 10 to six PSUs 20a-20f to be controlled by the control device 10. The central cable loom 12 is laid like the first and second connection plugs 14a-14f, 18a-18f and the connection cables 16a-16f in the system component module 100. To this end the second holding element 68 of the system component module 100 is provided with plug sockets 106 and U-shaped cable ducts 108 (see FIG. 6). The connection system 11 between the control device 10 and the PSUs 20a-20f can be laid completely outside the aircraft in the context of pre-assembly of the system component module 100. In the final assembly of the system component module 100 in the aircraft cabin 22, it is only necessary to connect the control device 10 via a main connection cable 110 (see FIGS. 3 and 11) to a higher-level communications system of the aircraft.

Figure 3:
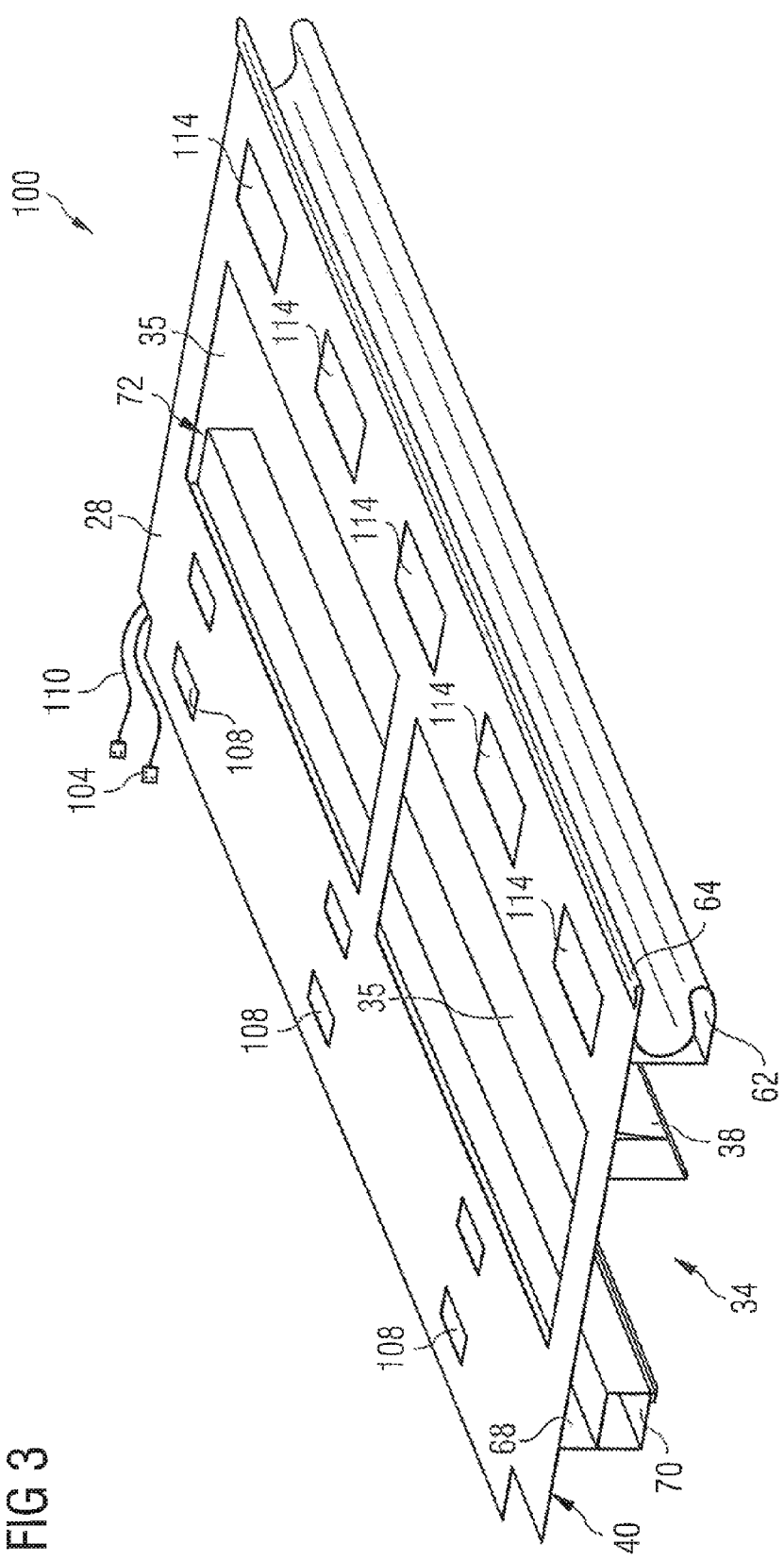
FIG. 3 shows a three-dimensional representation of a system component module, which is provided for mounting in a PSU area of the aircraft cabin according to FIG. 2.

A fastening device 112 for fastening the system component module 100 to the luggage compartment bottom panel 32 comprises a plurality of openings 114, which are formed in an area of the support 28 that faces the aisle area 36 of the aircraft cabin 22 in the mounted state of the system component module 100 in the aircraft cabin 22 (see FIG. 3). The fastening device 112 further comprises a plurality of mounting elements 116 fastenable to the luggage compartment bottom panel 22 (see FIGS. 5a to 5c). The openings 114 formed in the support 28 and the mounting elements 116 fastenable to the luggage compartment bottom panel 32 are dimensioned and formed such that it is possible in a first step to take the mounting elements 116 up as illustrated by arrow 91a in the openings 114 by a movement of the system component module 100 perpendicular to the bottom panel 32 of the luggage compartment 26 towards the bottom panel 32 of the luggage compartment 26. Furthermore, the design of the openings 114 and the mounting elements 116 permits a subsequent displacement as illustrated by double arrow 93a of the system component module 100 parallel to the luggage compartment bottom panel 32 and perpendicular to the longitudinal axis $L_s$ of the system component module. Such a displacement of the system component module 100 makes it possible to bring the luggage protection edge 64 fastened to the support 28 of the system component module 100 into engagement with the edge 66 of the luggage compartment bottom panel 32.

Figure 5A:
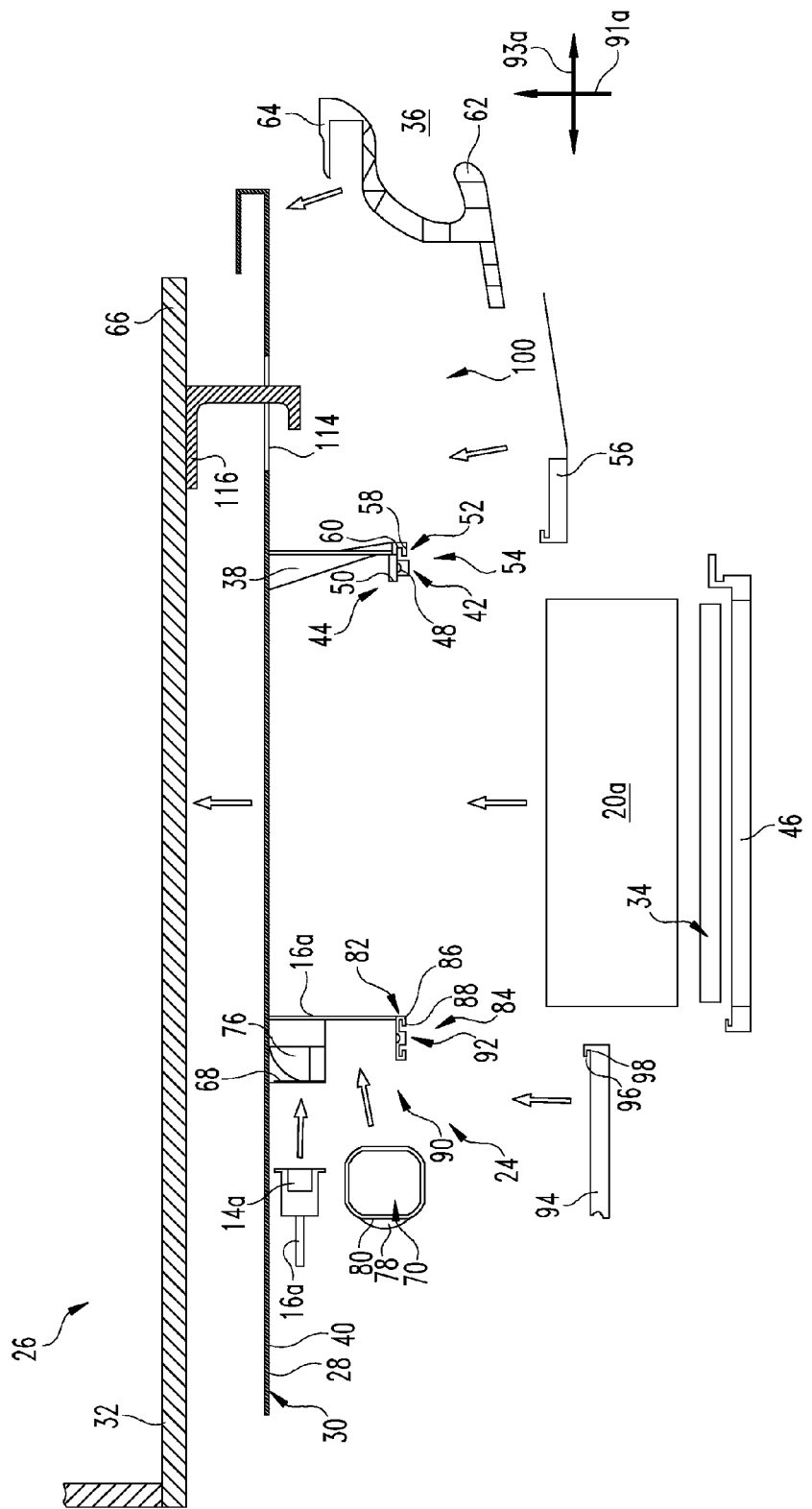
FIGS. 5a to 5c shows an exploded and an assembled cross-sectional representation respectively of the system component module according to FIG. 3.
Figure 5B:
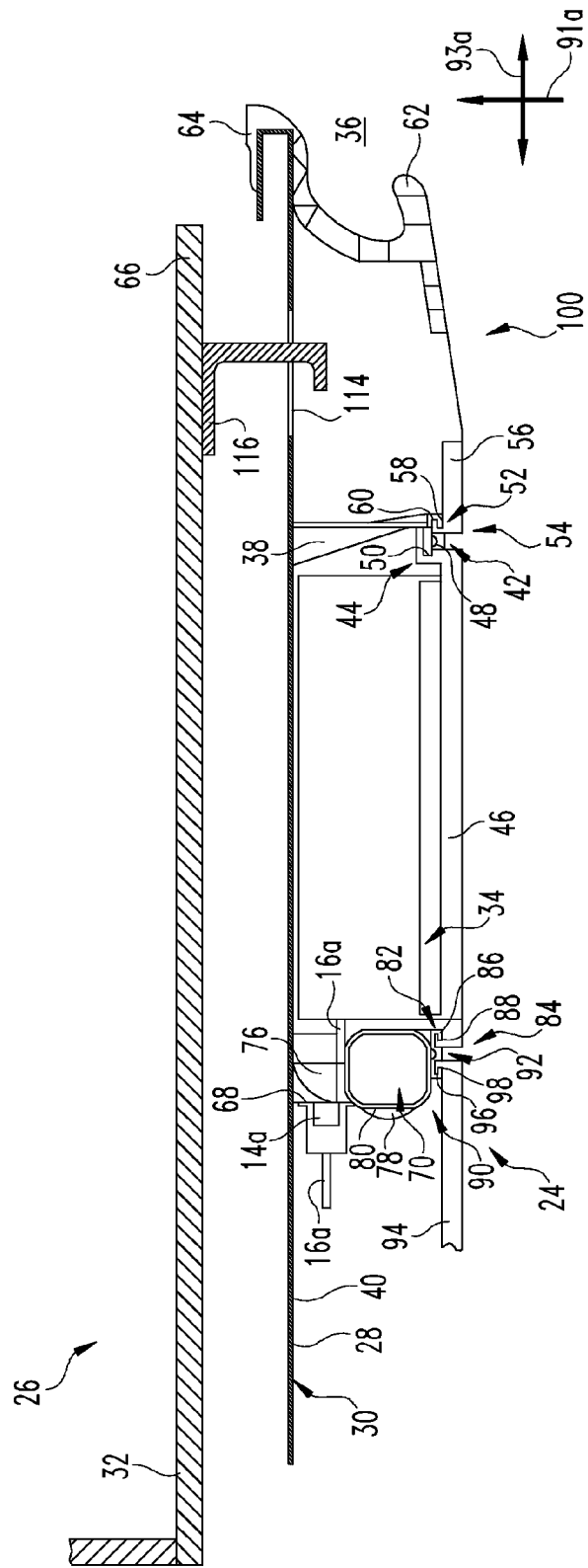
Figure 5C:
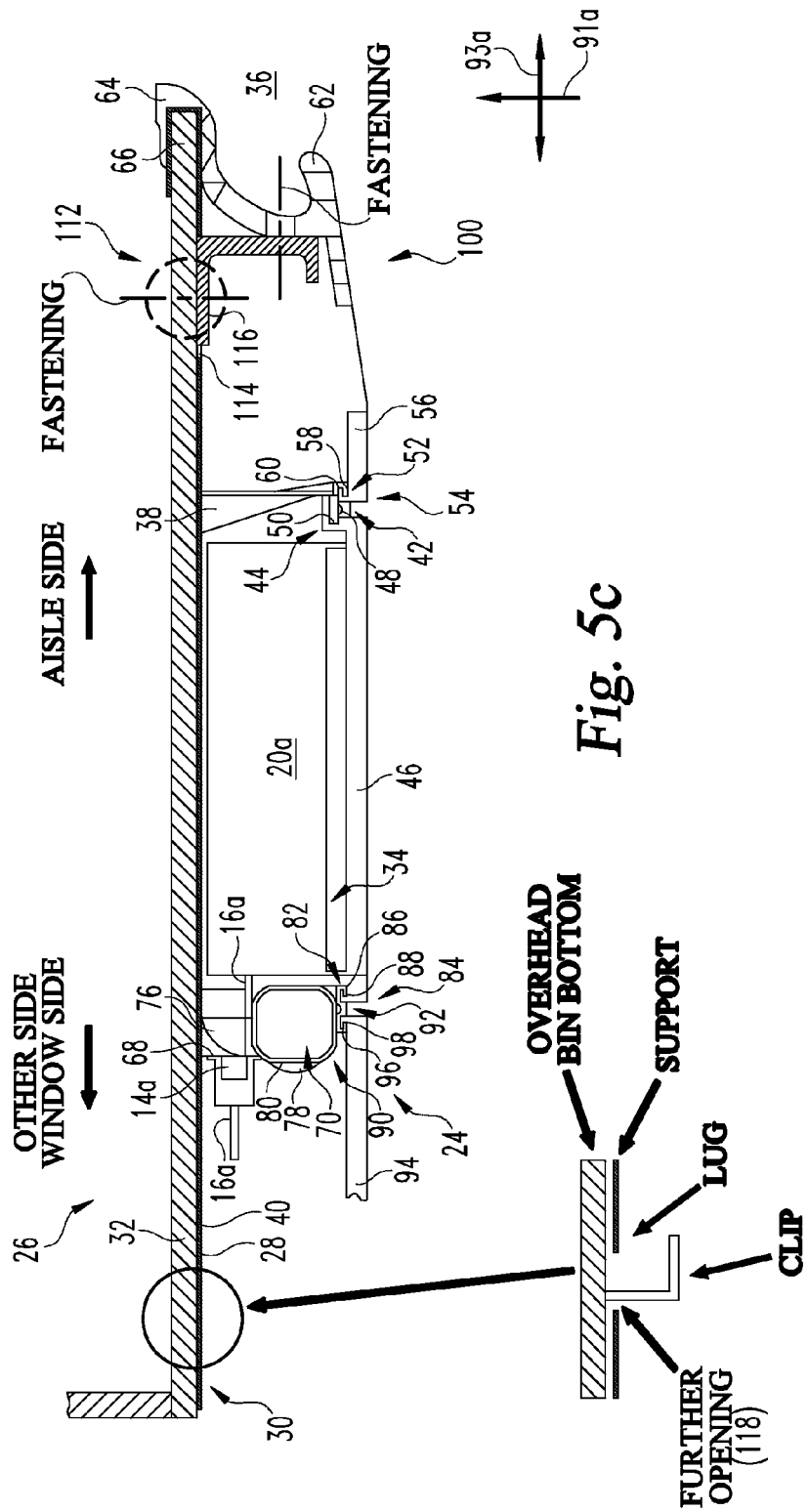

The mounting elements 116 can be fastened to the luggage compartment bottom panel 32 as portion of the fastening device 112 such as by screws, rivets or quick clamps in the region defined by the dashed circle on FIG. 5. When the system component module 100 has reached its final assembly position in the aircraft cabin 22 illustrated in FIGS. 5a to 5c, the system component module 100 can be fastened for example in the area of the handle strip 62 by screws, rivets or quick clamps to the mounting elements 116. The mounting elements 116 thus ensure an aisle-side fastening of the system component module 100 to the luggage compartment bottom panel 32.

In order to facilitate also a window-side fastening of the system component module 100 to the luggage compartment bottom panel 32, further openings 118 are provided in an area of the support 28 that is arranged on the window side in the mounted state of the system component module 100 in the aircraft cabin 22. Furthermore, in the area of these further openings 118, fastening lugs 120 illustrated in the FIGS. 8a and 8b, 9a and 9b and 10a and 10b are formed on the support 28. Finally, fastening clips 122 suitable for fastening to the luggage compartment bottom panel 32 are present. The openings 118 and the fastening clips 122 are formed dimensioned in such a way that first a take-up of the fastening clips 122 in the openings 118 is possible when the system component module 100 is moved perpendicular to the bottom panel 32 of the luggage compartment 26 towards the bottom panel 32 of the luggage compartment 26. A subsequent displacement of the system component module 100 relative to the luggage compartment bottom panel 32 in a direction parallel to the luggage compartment bottom panel 32 and perpendicular to the longitudinal axis $L_s$ of the system component module 100 causes the fastening lugs 120 formed on the support 28 to be taken up respectively in the fastening clips 122 fastened to the luggage compartment bottom panel 32.

The fastening clips 122 can, similar to the mounting elements 116, be fastened to the luggage compartment bottom panel 32 by screws, rivets or quick clamps. Following the take-up of the fastening lugs 120 in the fastening clips 122, additional fixing of the fastening lugs 120 in their position in the fastening clips 122 by screws, rivets or quick clamps is possible, but not urgently necessary.

The system component module 100 can be preassembled completely outside the aircraft cabin 22 and only then finally mounted as described above in the aircraft cabin 22.

The invention claimed is:

1. An aircraft system component module for mounting in an aircraft cabin, comprising:
 a support, the support comprising:
  a duct configured to receive at least one corresponding Personal Service Unit (PSU);
  an individual air supply system; and
  at least one opening formed in an upper surface of the support;
 at least one mounting element fastenable to a bottom of a luggage compartment installed in the aircraft cabin; and
 at least one fastener;
  wherein the at least one mounting element is fastenable to and dimensioned along the bottom of the luggage compartment such that the at least one opening, corresponding in number and dimension on the support to the at least one mounting element, is configured to allow the support to be installed on the bottom of the luggage compartment by:
  fastening the at least one mounting element to the bottom of the luggage compartment;
  positioning the support below the bottom of the luggage compartment so that at least one mounting element and at least one opening align;
  moving the support toward the bottom of the luggage compartment so that at least one mounting element passes through the at least one corresponding opening;
  displacing the support substantially parallel to the bottom of the luggage compartment to a final assembly position in the aircraft cabin; and
  fastening the support to the at least one mounting element with the at least one fastener.

2. The aircraft system component module according to claim 1, wherein attached to the support is at least one of:
 a handle strip,
 a luggage protection edge,
 a power supply unit,
 a static dissipation device,
 at least one PSU, comprising a plurality of personal service components, coupled to and accommodated within the duct;
 a control device programmed to control personal service components arranged in the PSU, and
 an electrical connection system interconnecting the control device to the personal service components.

3. The aircraft system component module according to claim 2, further comprising:
 a first holding element extending from a lower surface of the support, comprising:
  a first connection element, and
  a second connection element;
 a PSU duct cover; and
 a handle strip cover,
 wherein a first end of the PSU duct cover is matingly secured to the first connection element and covers the PSU duct; and
 wherein the handle strip cover is matingly secured to the second connection element.

4. The aircraft system component module according to claim 3, further comprising:
 a second holding element extending from a lower surface of the support, comprising:
  a first connection element, and
  a second connection element; and
 a cabin lighting panel;
 wherein an individual air pipe of the individual air supply system is formed by the second holding element;
 wherein a second end of the PSU duct cover is matingly secured to the first connection element of the second holding element; and
 wherein the cabin lighting panel is matingly secured to the second connection element of the second holding element.

5. The aircraft system component module according to claim 4,
 wherein the individual air pipe of the individual air supply system comprises:
  at least one end section on at least one of an end of the individual air pipe, and
  a central section;
 wherein the at least one end section is offset in at least one direction perpendicular to a longitudinal axis of the central section of the individual air pipe.

6. The aircraft system component module according to claim 1, further comprising:
 wherein the at least one opening and mounting element being located along an aisle side of the overhead compartment;
 at least one fastening clip fastenable to the bottom panel of the luggage compartment installed in the aircraft cabin,
 wherein the support further comprises:
  at least one further opening; and
  at least one fastening lug,
 wherein the at least one fastening clip is fastenable to and dimensioned along the bottom of the luggage compartment such that the at least one further opening, corresponding in number and dimension on the support to the at least one fastening clip, is configured to allow the support to be connected to the bottom of the luggage compartment, on a side opposite the aisle side, by:
  fastening the at least one fastening clip to the bottom of the luggage compartment;
  positioning the support below the bottom of the luggage compartment so that the at least one fastening clip and at least one further opening align;
  moving the support toward the bottom of the luggage compartment so that the at least one fastening clip passes through the at least one corresponding further opening;
  displacing the support substantially parallel to the bottom of the luggage compartment to the final assembly position, wherein the fastening lug of the support is inserted into the fastening clip fastened to the bottom panel of the luggage compartment.

7. A method of installing an aircraft system component module comprising a support having at least one opening formed in an upper surface thereof and at least one mounting element in an aircraft cabin, with the steps of:
   attaching a duct configured to receive at least one corresponding Personal Service Unit (PSU) to a lower surface of the support;
   attaching an individual air supply system to the lower surface of the support; and
   fastening the at least one mounting element to a bottom of a luggage compartment installed in the aircraft cabin;
   positioning the support with attached duct and individual air supply below the bottom of the luggage compartment so that the at least one mounting element and at least one opening in the upper surface of the support, which correspond in number and dimension, are in alignment;
   moving the support toward the bottom of the luggage compartment so that the at least one mounting element passes through the at least one corresponding opening in the support;
   displacing the support substantially parallel to the bottom of the luggage compartment to a final assembly position in the aircraft cabin; and
   fastening the support to the at least one mounting element with at least one fastener.

8. The method of installing an aircraft system component module according to claim 7, wherein prior to fastening the system component module to the bottom of the luggage compartment, attaching to the support at least one of:
   a handle strip,
   a luggage protection edge,
   a power supply unit,
   a static dissipating device,
   a control device programmed to control personal service components arranged in the PSU duct, and
   an electrical connection system interconnecting the control device for controlling personal service components arranged in the PSU duct to the personal service components arranged in the PSU duct.

9. The method of installing an aircraft system component module according to claim 8, further comprising the step of:
   attaching a PSU duct cover and a handle strip cover to a first holding element which extends from a lower surface of the support;
   wherein the first holding element comprises a first connection element and a second connection element;
   wherein a first end of the PSU duct cover is matingly secured to the first connection element and covers the PSU duct; and
   wherein the handle strip cover is matingly secured to the second connection element.

10. The method of installing an aircraft system component module according to claim 9, further comprising the step of:
    attaching the PSU duct cover and a cabin lighting panel to a second holding element which extends from a lower surface of the support;
    wherein the second holding element comprises a first connection element and a second connection element;
    wherein an individual air pipe of the individual air supply system is formed by the second holding element;
    wherein a second end of the PSU duct cover is matingly secured to the first connection element of the second holding element; and
    wherein the cabin lighting panel is matingly secured to the second connection element of the second holding element.

11. The method of installing an aircraft system component module according to claim 10, wherein the individual air pipe of the individual air supply system comprises:
    at least one end section on at least one end of the individual air pipe, and
    a central section;
    wherein the at least one end section is offset in at least one direction perpendicular to a longitudinal axis of the central section of the individual air pipe.

12. The method of installing an aircraft system component module according to claim 7, further comprising the steps of:
    attaching at least one fastening clip to the bottom panel of the luggage compartment;
    wherein the at least one opening and mounting element are located along an aisle side of the overhead compartment;
    wherein the support further comprises:
      at least one further opening; and
      at least one fastening lug,
    wherein the at least one fastening clip is fastened to and dimensioned along the bottom of the luggage compartment, on a side opposite the aisle side, such that the at least one further opening and at least one fastening lug correspond in number and dimension to said at least one fastening clip;
    aligning the at least one fastening clip with the at least one further opening during the step of positioning the support below the bottom of the luggage compartment;
    passing the at least one fastening clip through the at least one corresponding further opening during the step of moving the support toward the bottom of the luggage compartment; and
    inserting the at least one fastening lug within the at least one corresponding fastening clip during the step of displacing the support substantially parallel to the bottom of the luggage compartment into the final assembly position.

* * * * *